US011510094B2

United States Patent
Jain et al.

(10) Patent No.: US 11,510,094 B2
(45) Date of Patent: Nov. 22, 2022

(54) LIGHTWEIGHT S-1 LITE PROTOCOL DESIGN FOR CELLULAR INTERNET OF THINGS

(71) Applicant: Apple Inc., Cupertino, CA (US)

(72) Inventors: Puneet K. Jain, Hillsboro, OR (US); Sneha Nagarajan, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/743,168

(22) PCT Filed: Jul. 6, 2016

(86) PCT No.: PCT/US2016/041043
§ 371 (c)(1),
(2) Date: Jan. 9, 2018

(87) PCT Pub. No.: WO2017/027124
PCT Pub. Date: Feb. 16, 2017

(65) Prior Publication Data
US 2019/0098531 A1 Mar. 28, 2019

Related U.S. Application Data

(60) Provisional application No. 62/204,848, filed on Aug. 13, 2015.

(51) Int. Cl.
*H04W 28/04* (2009.01)
*H04W 76/12* (2018.01)
(Continued)

(52) U.S. Cl.
CPC ............ *H04W 28/04* (2013.01); *H04L 67/10* (2013.01); *H04L 67/12* (2013.01); *H04L 67/565* (2022.05);
(Continued)

(58) Field of Classification Search
None
See application file for complete search history.

(56) References Cited

U.S. PATENT DOCUMENTS

| 8,995,592 B2* | 3/2015 | Dao | H04W 72/042 455/39 |
|---|---|---|---|
| 2010/0296465 A1* | 11/2010 | Hooli | H04J 11/00 370/329 |

(Continued)

FOREIGN PATENT DOCUMENTS

| CN | 102111847 | 6/2011 |
|---|---|---|
| CN | 104604311 | 5/2015 |
| WO | 2017027124 A1 | 2/2017 |

OTHER PUBLICATIONS

3GPP TS 23.720 v0.1.0. "Architecture enhancements for Cellular Internet of Things." (Year: 2015).*

(Continued)

*Primary Examiner* — Andrew C Oh
(74) *Attorney, Agent, or Firm* — Fay Kaplun & Marcin, LLP

(57) ABSTRACT

Briefly, in accordance with one or more embodiments, a Cellular Internet of Things evolved Node B (CIoT eNB) comprises baseband processing circuitry to process a Cellular Internet of Things Application Protocol (CIAP) setup request message received from a CIoT gateway (CIoT GW), wherein the CIAP setup request message is to configure a reduced signaling overhead between the CIoT eNB and the CIoT GW, and generate a CIAP setup response message to be transmitted to the CIoT GW in response to the CIAP setup request message. In other embodiments, a Cellular Internet of Things gateway (CIoT GW) comprises baseband processing circuitry to generate a Cellular Internet of Things Application Protocol (CIAP) setup request message to be transmitted to a CIoT evolved Node B (CIoT eNB), and (Continued)

process a CIAP setup response message received from the CIoT eNB in response to the CIAP setup request message.

24 Claims, 10 Drawing Sheets

(51) Int. Cl.
    *H04L 69/28*     (2022.01)
    *H04L 67/12*     (2022.01)
    *H04L 67/10*     (2022.01)
    *H04L 67/565*     (2022.01)
    *H04W 80/12*     (2009.01)
    *H04W 92/04*     (2009.01)

(52) U.S. Cl.
    CPC ............. *H04L 69/28* (2013.01); *H04W 76/12* (2018.02); *H04W 80/12* (2013.01); *H04W 92/045* (2013.01)

(56) References Cited

U.S. PATENT DOCUMENTS

| | | | |
|---|---|---|---|
| 2011/0019776 A1* | 1/2011 | Zhang | H04L 5/0023 375/340 |
| 2011/0021216 A1* | 1/2011 | Pudney | H04W 4/12 455/466 |
| 2011/0063977 A1* | 3/2011 | Halfmann | H04L 47/10 370/235 |
| 2011/0213871 A1 | 9/2011 | Rocco et al. | |
| 2013/0114756 A1* | 5/2013 | Jia | H04L 5/0048 375/295 |
| 2013/0194931 A1* | 8/2013 | Lee | H04L 5/0053 370/329 |
| 2013/0343325 A1* | 12/2013 | Nishida | H04W 36/0011 370/329 |
| 2014/0112146 A1* | 4/2014 | Hu | H04W 28/18 370/235 |
| 2014/0269249 A1* | 9/2014 | Bai | H04L 27/0008 370/204 |
| 2014/0329550 A1* | 11/2014 | Diachina | H04W 68/02 455/458 |
| 2015/0092554 A1* | 4/2015 | Mochizuki | H04W 24/10 370/235 |
| 2015/0117347 A1* | 4/2015 | Iwai | H04W 28/24 370/329 |
| 2015/0280876 A1* | 10/2015 | You | H04L 1/08 370/329 |
| 2015/0289229 A1* | 10/2015 | Ahluwalia | H04W 68/04 455/458 |
| 2015/0289236 A1* | 10/2015 | Seo | H04J 11/0023 370/335 |
| 2015/0358972 A1* | 12/2015 | Lee | H04W 48/18 370/329 |
| 2015/0373699 A1* | 12/2015 | Xu | H04W 76/10 370/329 |
| 2016/0007138 A1* | 1/2016 | Palanisamy | H04W 4/70 455/41.2 |
| 2016/0050561 A1* | 2/2016 | Pudney | H04W 12/0431 713/151 |
| 2016/0073415 A1* | 3/2016 | Rahman | H04J 11/004 370/329 |
| 2016/0105981 A1* | 4/2016 | Harris | G06F 12/1009 312/236 |
| 2016/0127936 A1* | 5/2016 | Chatterjee | H04W 4/70 370/252 |
| 2017/0006528 A1* | 1/2017 | Bari | H04W 4/00 |
| 2017/0013565 A1* | 1/2017 | Pelletier | H04W 72/0473 |
| 2017/0019915 A1* | 1/2017 | Nogami | H04L 5/0053 |
| 2017/0048112 A1* | 2/2017 | Rönneke | H04L 41/12 |
| 2017/0048845 A1* | 2/2017 | Chen | H04W 4/70 |
| 2017/0078006 A1* | 3/2017 | Liu | H04W 72/042 |
| 2017/0135134 A1* | 5/2017 | Rune | H04W 36/0005 |
| 2017/0150467 A1* | 5/2017 | Tamura | H04W 48/14 |
| 2017/0195102 A1* | 7/2017 | Xiong | H04L 5/0053 |
| 2017/0215188 A1* | 7/2017 | Kim | H04L 5/0091 |
| 2017/0223725 A1* | 8/2017 | Xiong | H04W 72/042 |
| 2017/0251516 A1* | 8/2017 | Bangolae | H04W 76/27 |
| 2017/0257860 A1* | 9/2017 | Nam | H04W 72/0446 |
| 2017/0264408 A1* | 9/2017 | Patel | H04L 5/0048 |
| 2017/0272214 A1* | 9/2017 | Chen | H04L 5/0001 |
| 2017/0280479 A1* | 9/2017 | Frenne | H04W 48/08 |
| 2017/0288835 A1* | 10/2017 | Kim | H04L 5/0051 |
| 2017/0331671 A1* | 11/2017 | Olsson | H04L 41/04 |
| 2017/0367046 A1* | 12/2017 | Papasakellariou | H04L 5/0048 |
| 2018/0176043 A1* | 6/2018 | Kim | H04L 5/0048 |
| 2018/0213563 A1* | 7/2018 | Yang | H04W 74/0808 |
| 2018/0294935 A1* | 10/2018 | Uchiyama | H04L 5/0058 |
| 2018/0316562 A1* | 11/2018 | Lepp | H04L 41/0806 |
| 2018/0323923 A1* | 11/2018 | Wang | H04J 11/0073 |
| 2018/0324761 A1* | 11/2018 | Velev | H04W 72/04 |
| 2018/0332462 A1* | 11/2018 | Kim | H04W 4/70 |
| 2018/0343577 A1* | 11/2018 | Takiguchi | H04W 24/10 |
| 2019/0007984 A1* | 1/2019 | Kuroda | H04W 8/02 |
| 2019/0013912 A1* | 1/2019 | Tomeba | H04L 27/26 |
| 2019/0029046 A1* | 1/2019 | Li | H04W 72/0446 |
| 2019/0036658 A1* | 1/2019 | Kim | H04L 5/005 |
| 2019/0037483 A1* | 1/2019 | Li | H04W 72/0453 |
| 2019/0069312 A1* | 2/2019 | Oh | H04W 72/0446 |
| 2019/0081744 A1* | 3/2019 | Yang | H04L 5/0082 |
| 2019/0140806 A1* | 5/2019 | Andersson | H04L 27/2666 |
| 2019/0253870 A1* | 8/2019 | Rönneke | H04W 8/08 |
| 2019/0281508 A1* | 9/2019 | Kawasaki | H04W 76/11 |
| 2019/0297668 A1* | 9/2019 | Kawasaki | H04W 36/18 |
| 2019/0297669 A1* | 9/2019 | Kawasaki | H04W 8/08 |
| 2019/0387504 A1* | 12/2019 | Jung | H04L 5/0053 |
| 2020/0028647 A1* | 1/2020 | Kim | H04L 5/0048 |
| 2020/0266963 A1* | 8/2020 | Song | H04L 5/0073 |

OTHER PUBLICATIONS

ETSI TS 136 410 v9.1.1. LTE; E-UTRAN; S1 general aspects and principles. May 2011.*
Nokia / Halberd Bastion, "LTE evolution for IoT Connectivity" (May 15, 2015) <https://halberdbastion.com/sites/default/files/2017-06/Nokia_LTE_Evolution_for_IoT_Connectivity_White_Paper.pdf>.*
International Search Report and Written Opinion received for International Application No. PCT/US2016/041043, dated Oct. 13, 2016, 12 pages.
3GPP, "Study on Architecture Enhancements for Cellular Internet of Things", Technical Specification, Mar. 2016, 94 pages, V13.0.0, 3GPP, Sophia Antipolis Valbonne, France.
3GPP, "Architecture Enhancements to Facilitate Communications With Packet Data Networks and Applications", Technical Specification, Jun. 2015, 70 pages, V13.2.0, 3GPP, Sophia Antipolis Valbonne, France.
ETSI, "Architecture Part 2: Study for the Merging of Architectures Proposed for Consideration by oneM2M", Technical Report, Apr. 2015, 13 pages, V1.0.0, European Telecommunications Standards Institute, Sophia Antipolis, France.
International Preliminary Report on Patentability received for International Application No. PCT/US2016/041043, dated Feb. 22, 2018, 10 pages.
Office Action received for European Patent Application No. 16745920.5 dated Jul. 15, 2019, 4 pages.

* cited by examiner

LIGHTWEIGHT S-1 LITE PROTOCOL DESIGN FOR CELLULAR INTERNET OF THINGS

CROSS-REFERENCE TO RELATED APPLICATIONS

The present application is a national stage application under 35 U.S.C. § 371 of International Application No. PCT/US2016/041043, filed Jul. 6, 2016 and entitled LIGHTWEIGHT S-1 LITE PROTOCOL DESIGN FOR CELLULAR INTERNET OF THINGS, which in turn claims the benefit under 35 U.S.C. § 119(e) of U.S. Application No. 62/204,848 filed Aug. 13, 2015. Said Application No. PCT/US2016/041043 and said Application No. 62/204,848 are hereby incorporated herein by reference in their entireties.

BACKGROUND

The existing S1 Application Protocol (AP) interface in accordance with current Third Generation Partnership Project (3GPP) standards and existing S1 AP message procedures have high message overhead in addition to a large number of message procedures and information elements (IEs) elements that are not optimized to support Internet of Things (IoT) communications using a cellular network. The use cases for Cellular Internet of Things (CIoT) include gas meters, smart home sensors, industrial sensors and/or other applications which all form a part of Internet of Things. The evolution of the Internet of Things includes an estimated prediction of billions of CIoT user equipment (CIoT UE) devices and a clean slate architecture with optimal message procedures to ensure low signaling overhead than is currently available using exiting 3GPP standards.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
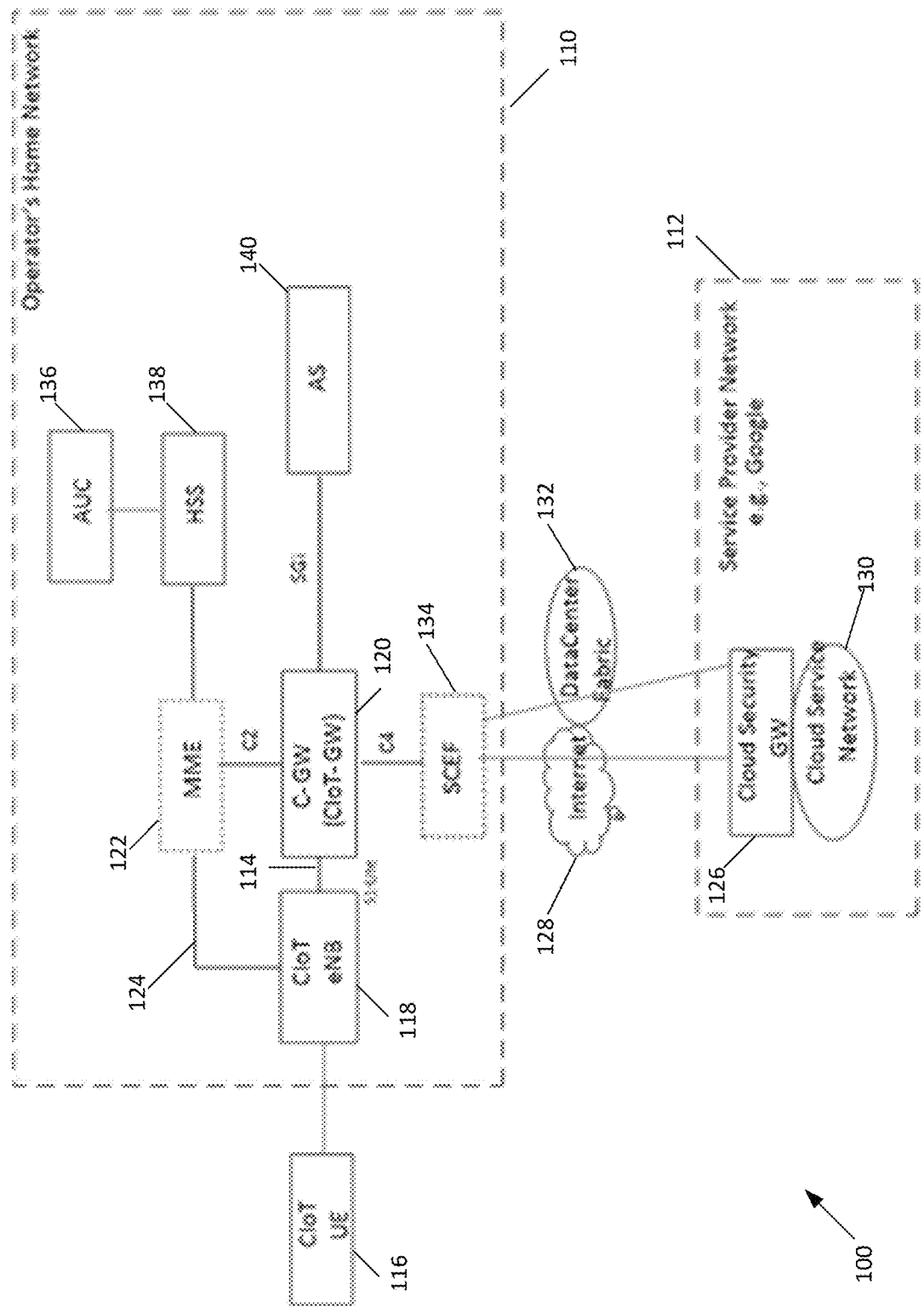
FIG. 1 is a diagram of a Cellular Internet of Things (CIoT) architecture in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled, however, may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. "Over", however, may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a cellular Internet of Things (CIoT) architecture in accordance with one or more embodiments will be discussed. FIG. 1 show a cellular network 100 comprising an network operator's home network 110 to couple to a service provider network 112. Service provider network 112 may include a cloud security gateway (GW) 126 to couple to home network 110 via the Internet 128, and a cloud service network 130 to couple to home network 110 via a data center fabric 132. Home network 110 may comprise a service capability exposure function (SCEF) 134, an authentication center (AUC) 136, a home subscriber server (HSS) 138, and/or an access server (AS) 140.

Network 100 may provide an S1-Lite Interface 114 to serve CIoT User Equipment (UE) devices such as CIoT-UE 116 and/or other devices or gateways. As shown in FIG. 1, S1-Lite Interface 114 may be disposed between CIoT evolved Node B (CIoT eNB) and CIoT access gateway (CIoT GW or C-GW) 120. CIoT gateway 120 may comprise a mobility management entity (MME) 112 and serving gateway (SGW) (not shown) in addition to a packet gateway (PGW) (not shown). In some embodiments, MME 112 may be integrated with CIoT GW 120, and in other embodiments CIoT GW 120 may comprise a separate entity, although the scope of the claimed subject matter is not limited in these respects. An S1 Lite-C Interface 124 may connect MME 122 and CIoT eNB 118, and an S1 Lite-U interface may be utilized for user plane communication between CIoT eNB 118 and the SGW of CIoT GW 120. As shown in FIG. 1, S1 Lite Interface 114 may provide a clean slate solution for the architecture for a CIoT Access Network (CAN) in order to enable efficient utilization of the resource functions of a power-efficient CIoT-UE 116. An example of such a CAN is shown in and described with respect to FIG. 2, below.

Figure 2:
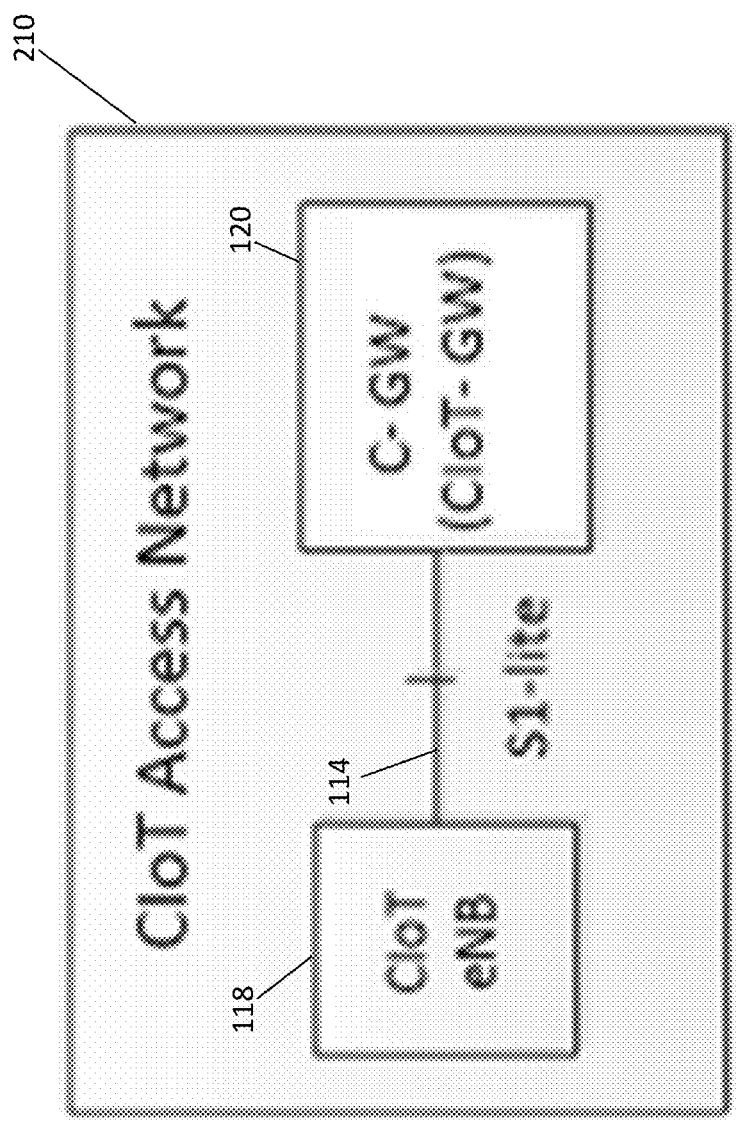
FIG. 2 is a diagram of an S1-Lite interface in the Cellular Internet of Things (CIoT) Access Network (CAN) in accordance with one or more embodiments.

Referring now to FIG. 2, a diagram of an S1-Lite interface in a CIoT Access Network (CAN) in accordance with one or more embodiments will be discussed. As shown in FIG. 2, CIoT access network 210 comprises CIoT eNB coupled with CIoT GW 120 via an S1-Lite interface 114. In one or more embodiments, S1-Lite interface 114 comprises an S1-Lite C interface as defined in an architecture of CAN 210 as shown in and described with respect to FIG. 3, below.

Figure 3:
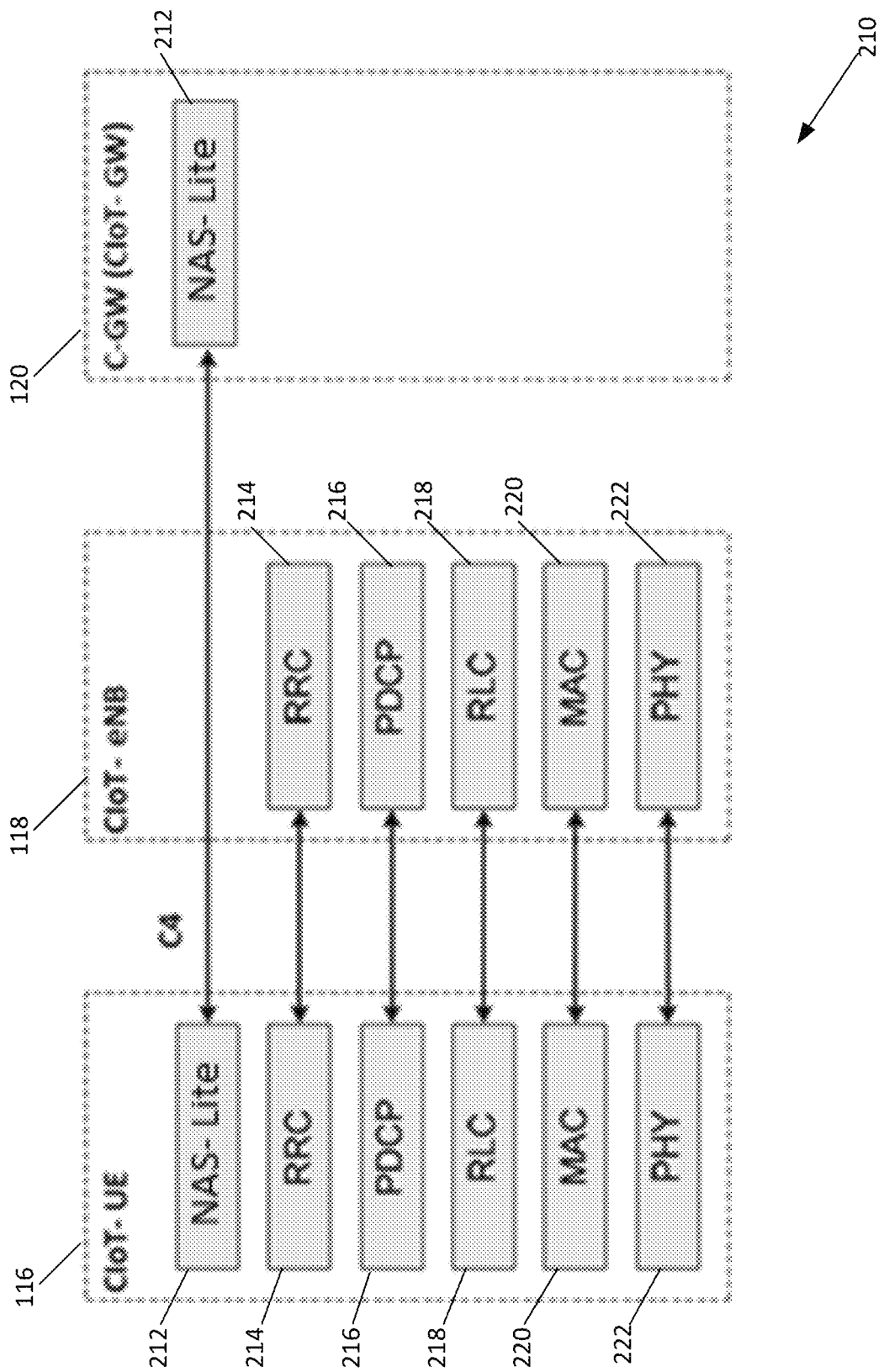
FIG. 3 is a diagram of a combined control plane-user plane control stack of a CAN in accordance with one or more embodiments.

Referring now to FIG. 3, a diagram of a combined control plane-user plane control stack of a CAN in accordance with one or more embodiments will be discussed. In the clean slate architecture of CAN 210, there is no separate user plane as data is sent over a Non-Access Stratum (NAS) layer. In such an arrangement, the control plane comprises protocols for control and support of the user plane functions. Accordingly, the following control planes are used in a CI interface/narrow band air interface Cellular IoT Terrestrial Radio Access Network (CITRAN) mode. In wherein Uu may be analogous to the Evolved Universal Terrestrial Radio Access (E-UTRA) per a Long Term Evolution (LTE) air interface.

FIG. 3 shows the protocol stack for the control-plane comprising a Non-Access Stratum (NAS) Lite protocol layer 212 to couple CIoT UE 116 with CIoT GW 120 via CIoT eNB 118. Furthermore, CIoT UE 116 couples to CIoT eNB using the flowing layers. Radio Resource Control (RRC) layer 214, (PDCP) layer 216, Radio Link Control (RLC) layer 218, Media Access Control (MAC) layer 220, and physical (PHY) layer 222. The PDCP layer 216 is terminated in CIoT eNB 118 on the network side and performs the functions listed for the control plane in security architecture, for example ciphering and integrity protection. RLC layer 218 and MAC layer are terminated in CIoT eNB 118 on the network side and perform the same functions as for the user plane. RRC layer 214 is terminated in CIoT eNB 118 on the network side and performs the following functions: Cellular Internet of Things Application Protocol (CIAP) Paging, RRC connection management, resource block (RB) control, and/or user equipment (UE) measurement reporting and control. The Non-Access Stratum (NAS)-Lite protocol layer is terminated in the CIoT GW 120 on the network side and performs reduced Non-Access Stratum (NAS) functions including: Last Seen timer updating, CIAP data message (CIAP_Data_Msg) handling, authentication, buffer handling, and security control.

Figure 4:
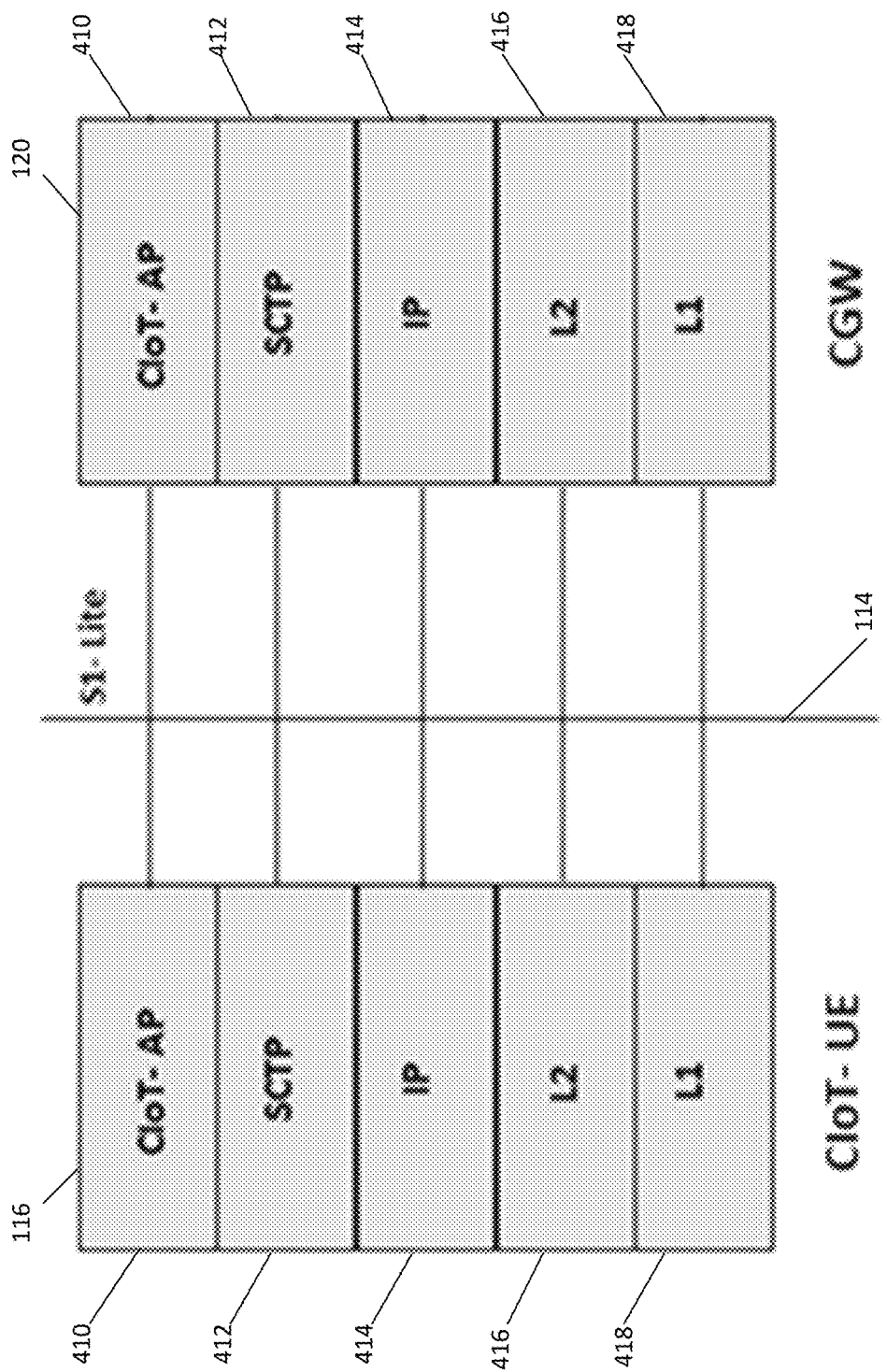
FIG. 4 is a diagram of an S1-Lite interface in accordance with one or more embodiments.

Referring now to FIG. 4, a diagram of an S1-Lite interface in accordance with one or more embodiments will be discussed. As shown in FIG. S1 Lite interface 114 is the interface within the CIoT Access Gateway between CIoT GW 120 and CIoT UE 116. On S1 Lite interface 114, the application layer signaling protocol may be referred to as CIoT Application Protocol (CIoT AP) 410. Since potentially there may be billions of CIoT UE 116 devices sending messages, in the clean slate architecture an efficient way to provide congestion control may be to utilize a Stream Control Transmission Protocol (SCTP) 412 for signaling transport. In one example, SCTP 412 may be provided on top of internet protocol (IP) 414. In addition, a Layer 2 protocol 416 and a Layer 1 protocol 418 may be provided. In one or more embodiments, the procedures for CIoT AP 410 procedures are outlined in Table 1, below.

TABLE 1

| CIoT- AP Elementary Procedures | |
| --- | --- |
| CIoT-AP Messages name | Required for S1- Lite |
| CIAP- PAGING | NEEDED |
| CIAP- SETUP | NEEDED |
| CIAP- SETUP RESPONSE | NEEDED |
| CIAP_DATA_MSG | NEEDED |
| LST (Last seen timer) UPDATE | NEEDED |
| LST (Last seen timer) CHECK | NEEDED |

Figure 5:
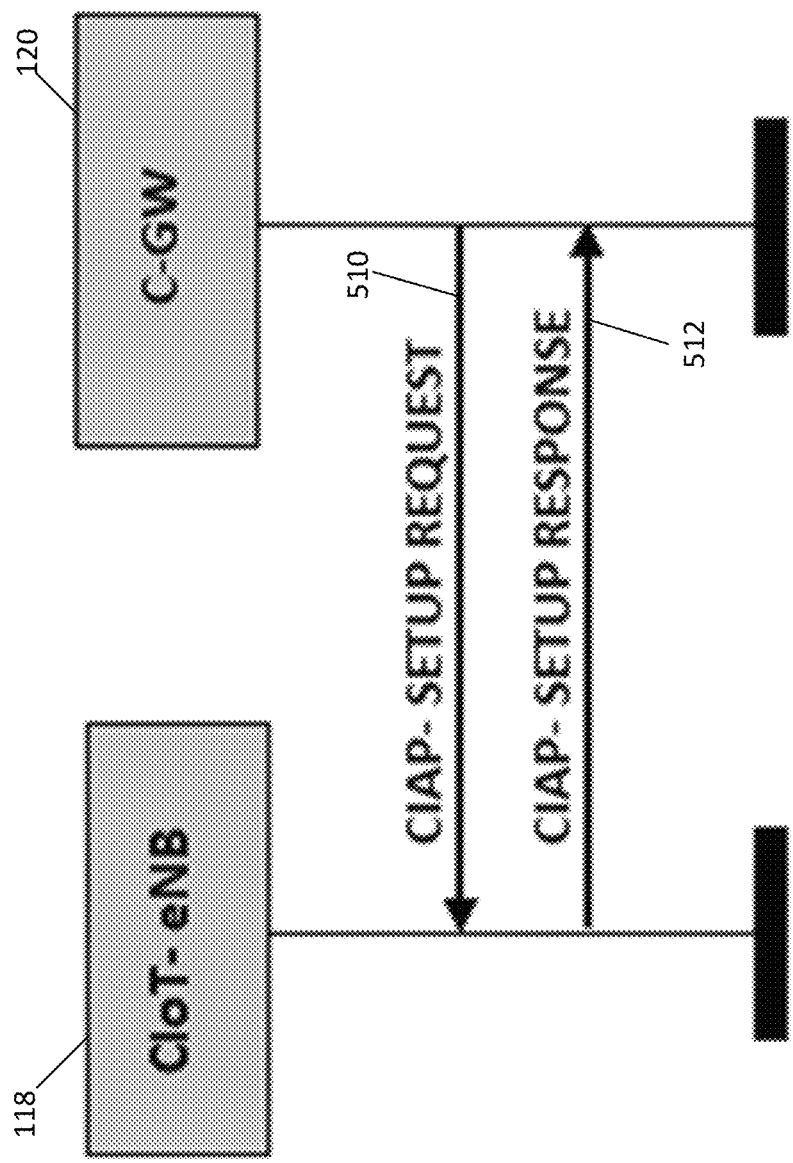
FIG. 5 is a message flow diagram of a Cellular Internet of Things Application Protocol (CIAP) setup request in accordance with one or more embodiments.

Referring now to FIG. 5, a message flow diagram of a Cellular Internet of Things Application Protocol (CIAP) setup request in accordance with one or more embodiments will be discussed. A CIAP setup request may be a message to configure a reduced signaling overhead between CIoT eNB 118 and CIoT GW 120 and/or between CIoT eNB 118 and CIoT UE 116. A reduced signaling overhead may refer to, for example, a low throughput or a very low throughput such as transmission of around one packet or very few packets at a frequency of around once per day or even less frequently, wherein the packet size may around 160 bytes or less as an example. Typically, with a reduced signaling overhead arrangement, the transmitting devices may have little or no mobility and therefore do not perform a handover, or very infrequently perform a handover. Such packets may be transmitted very infrequently or sometimes only in an emergency situation, and also may be transmitted with a low or very low transmission rate, for example around 180 kilohertz (kHz) or so. It should be noted that these are merely example characteristics of a reduced signaling overhead, and the scope of the claimed subject matter is not limited in these respects. The following CIoT-AP 410 procedures may be utilized in a CIoT Clean Slate Architecture. As shown in FIG. 5, the CIAP SETUP REQUEST message 510 is an initial setup request message from CIoT GW 120 to CIoT eNB 118. The CIAP SETUP REQUEST message may contain a last seen timer information element (IE), the CIAP_Data_Msg Protocol Data Unit (PDU) IE, the Trace Activation IE, the Local Area Identity (LAI) IE, the CIoT UE Radio Capability IE, and/or the Subscriber Profile Identity (ID) for Radio Access Technology (RAT)/Frequency priority IE. The CIoT eNB 118 then provides a CIAP SETUP RESPONSE 512 to the CIoT GW 120.

In one or more embodiments, the CIAP setup request may be referred to as a Connection Establishment Procedure wherein the CIAP SETUP REQUEST message 510 may be referred to as an S1-AP connection establishment indication procedure. In such embodiments, the Connection Establishment Indication procedure may enable the CIoT GW 120 and/or MME 122 to provide information to eNB 118 to complete the establishment of the UE-associated logical S1-connection after receiving an INITIAL UE MESSAGE message, for example if CIoT GW 120 and/or MME 122 has no non-access stratum (NAS) protocol data unit (PDU) to send in the downlink (DL) for Control Plane CIoT evolved packet system (EPS) Optimization. The capability of the UE 116 (UE Radio Capability) may be provided from the CIoT GW 120 and/or MME 122 to eNB 118 in this procedure, and may be included in a response or message analogous to CIAP SETUP RESPONSE 512. If the radio capability of UE 116 is not included, eNB 118 may be triggered to request the UE Radio Capability from UE 116 and to provide the UE Radio Capability to the CIoT GW 120 and/or MME 122 in a UE CAPABILITY INFO INDICATION message. Such a procedure may be initiated by the CIoT GW 120 and/or MME 122. It should be noted that the terminology and/or procedures are merely example implementations of a CIAP setup request or a Connection Establishment Procedure, and the scope of the claimed subject matter is not limited in these respects.

Figure 6:
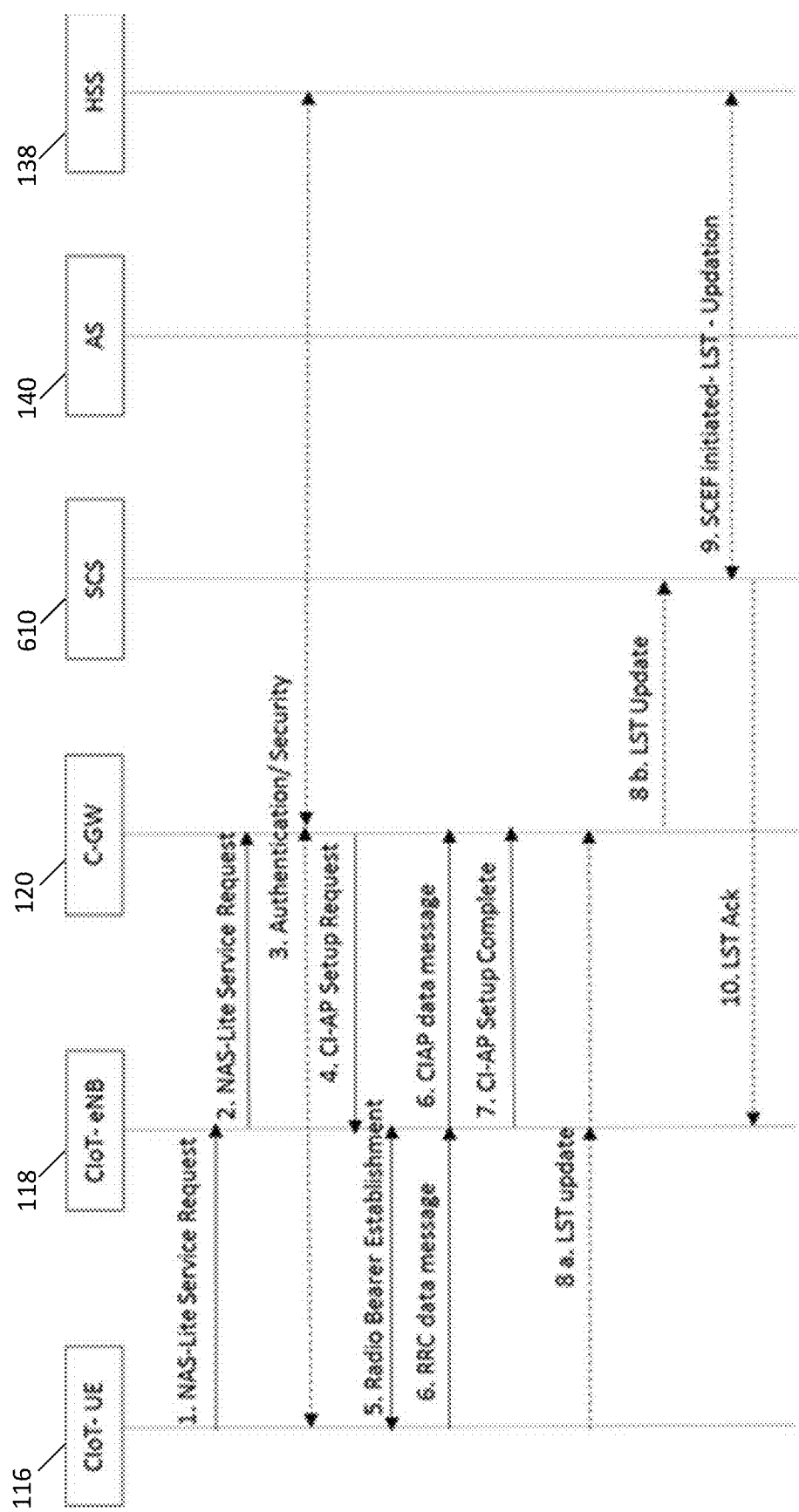
FIG. 6 is a diagram of an end-to-end message flow diagram for a CIoT UE Service Request in accordance with one or more embodiments.

Referring now to FIG. 6, a diagram of an end-to-end message flow diagram for a CIoT UE Service Request in accordance with one or more embodiments will be discussed. The Service Request could either be a CIoT UE 116 originating request or a network originating request reporting related information element (IE). The flow in FIG. 6 includes CIoT UE 116, CIoT eNB 118, CIoT GW 120, Service Capability Server (SCS) 610, access server (AS) 140, and/or home subscriber server (HSS) 138. In the diagram, Last Seen Time (LST) may refer to a last timer update sent by CIoT UE 116 before going to sleep. For a CIoT UE 116 triggered Service Request as shown in FIG. 6, the CIoT UE 116 sends a CIoT Non-Access Stratum (C-NAS) message Service Request towards CIoT GW 120 encapsulated in a radio resource control (RRC) message to CIoT eNB 118. The one or more RRC messages may be utilized to carry the CIoT temporary mobile subscriber identity (C-TMSI). The C-TMSI may comprise an encryption derived from the international mobile subscriber identity (IMSI) of CIoT UE 116 and may be referred to as a CIoT IMSI. CIoT eNB 118 then forwards the C-NAS message to CIoT GW 120. The NAS message may be encapsulated in a CIoT AP 410 comprising an Initial UE Message such as NAS message, E-UTRAN cell global identifier (ECGI) of the serving cell, a C-TMSI, a closed subscriber group identity (CSG ID), and/or a CSG access Mode. If CIoT GW 120 is unable to handle the Service Request, then CIoT GW 120 will reject the Service Request.

Figure 7:
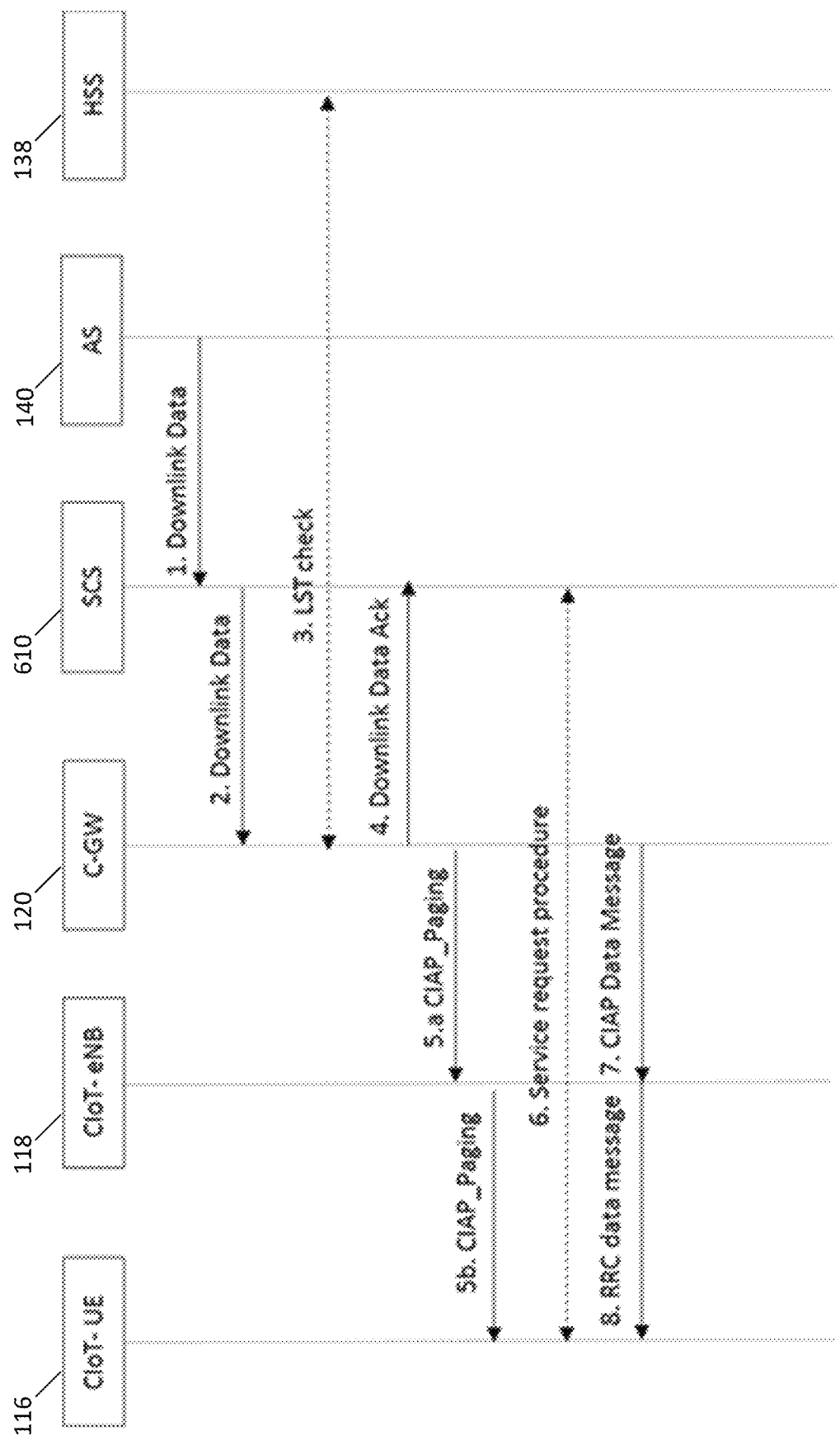
FIG. 7 is a diagram of an end-to-end message flow diagram of a Cellular Internet of Things (CIoT) access network triggered service request in accordance with one or more embodiments.

Referring now to FIG. 7, a diagram of an end-to-end message flow diagram of a CIoT access network triggered service request in accordance with one or more embodiments will be discussed. With a CIoT Access Network Triggered Service Request as shown in FIG. 7, the downlink data mat be initiated by the application server (AS) 140 over an application programming (API) interface. Once the downlink data is received by CIoT GW 120, then CIoT GW 120 conducts a last seen time check for the destination CIoT UE 116 subscriber identity carried in the message. Based on this information, an estimated next wake time may be determined. The message then may be discarded or stored in a buffer of CIoT GW 120 based on this information element (IE). If the incoming message is not discarded, a downlink data acknowledgement may be sent to SCS 610 by CIoT GW 120. If SCS 610 does not receive a downlink data acknowledgement, then SCS 610 sends the downlink data message again after an expiry timer. Once CIoT GW 120 sends a downlink data acknowledgement to SCS 610, CIoT GW simultaneously pages CIoT eNB 118 which in turn pages CIoT UE 116.

Figure 8:
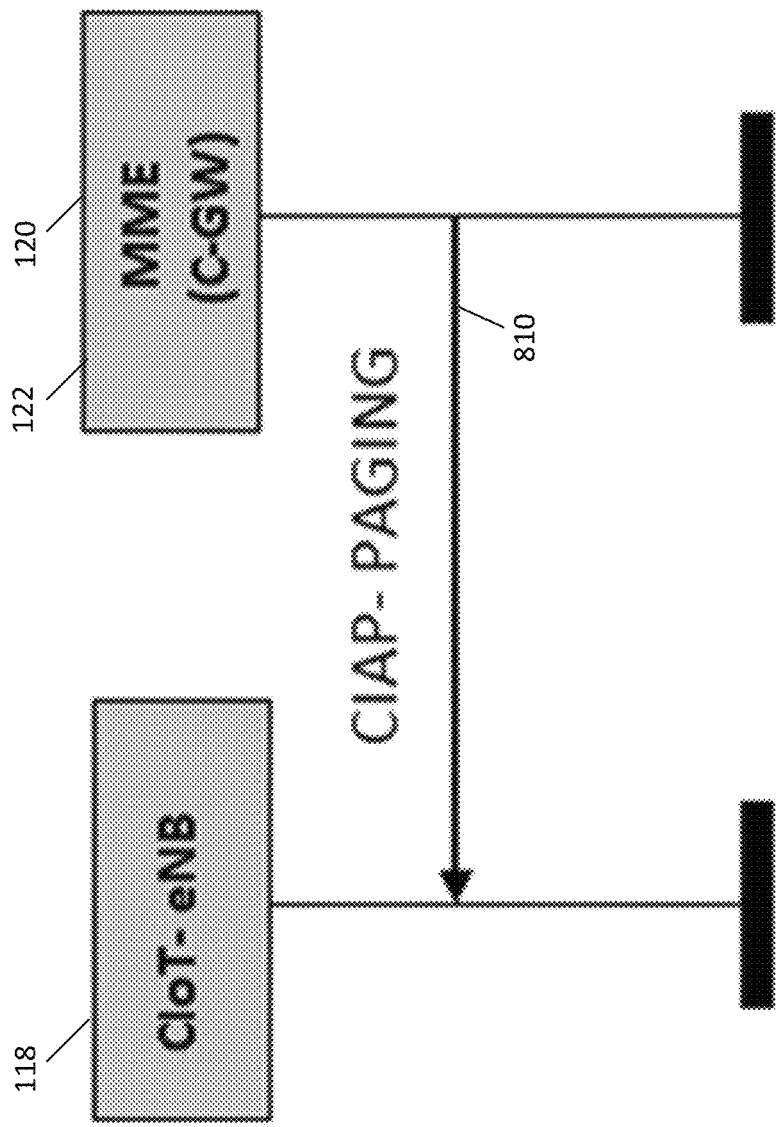
FIG. 8 is a message flow diagram of Cellular Internet of Things Application Protocol (CIAP) paging in accordance with one or more embodiments.

Referring now to FIG. 8, a message flow diagram of CIAP paging in accordance with one or more embodiments will be discussed. As shown in FIG. 8, CIoT Gateway (CIoT GW) 120 may initiate the paging procedure by sending a CIAP-PAGING message 810 to CIoT eNB 118. In some embodiments, paging may occur only during a network triggered service request, for example as shown in and described with respect to FIG. 7, above. Paging may be implemented in accordance to an idle mode power saving mode (PSM). In some embodiments, a tracking area update (TAU) accept and/or a routing area update (RAU) accept in CIoT related signaling may not be needed. As a result, a TAU request or a RAU request will not be involved with the signaling procedures. The following information elements (IEs) may be involved with CIAP Paging as shown in Table 2, below.

TABLE 2

| CIAP Paging Information Elements | |
|---|---|
| IE/Group Name | Presence |
| Message Type | M |
| CIoT- UE Identity Index value | M |
| CIoT- UE Paging Identity | M |
| CIAP- Paging eDRX | O |
| CIAP- Paging Priority | O |
| UE Radio Capability for Paging | O |

For CIoT UE Paging Identity, a CIoT UE 116 could be a gateway that supports up to 1,024 CIoT UE 116 devices. A CIoT international mobile subscriber identity (C-IMSI) may be utilized for subscriber identification and may be stored in the subscriber identity module (SIM) card of CIoT UE 116. The C-IMSI may comprise a mobile country code (MCC) comprising 3 digits, a mobile network code (MNC) comprising 2 or 3 digits, and a CIoT subscription identification number (CSIN) comprising 14 or 15 digits. Furthermore, a gateway subscriber identification number (GSIN) may identify CIoT GW 120. Thus, a CSIN may comprise a GSIN comprising 5 digits and a mobile subscriber identification number comprising 10 digits. The C-TMSI may have the size of 4 octets and may be allocated by CIoT GW 120. The C-TMSI information element (IE) may represent the identity with which CIoT UE 116 is paged according to Table 3, below.

TABLE 3

| CIoT UE Paging Identity | |
|---|---|
| IE/Group Name | Presence |
| CHOICE UE Paging Identity | M |
| >C-TMSI | |
| >>IMSI | M |

Figure 9:
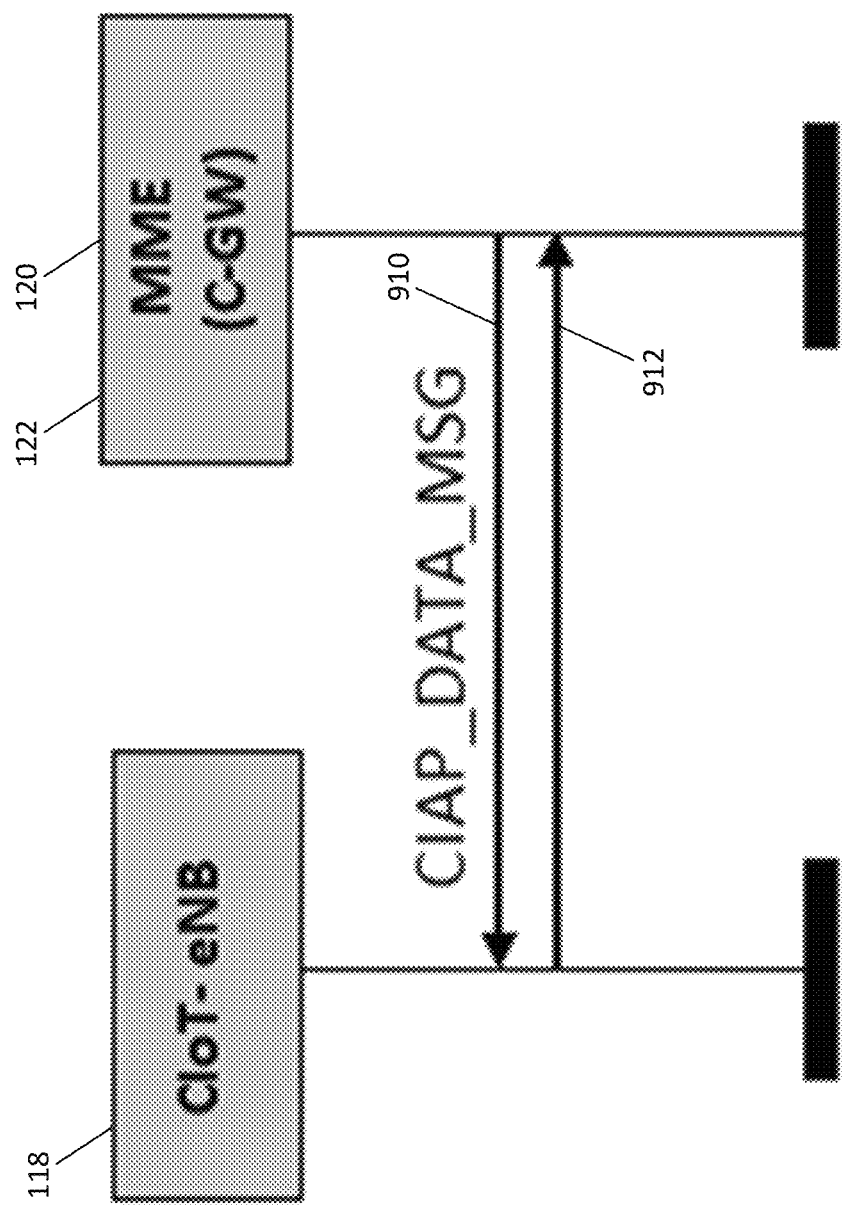
FIG. 9 is a message flow diagram of a Cellular Internet of Things Application Protocol (CIAP) data message in accordance with one or more embodiments.

Referring now to FIG. 9, a message flow diagram of a CIAP data message (CIAP_DATA_MSG) in accordance with one or more embodiments will be discussed. The flow of a CIAP data message may be as follows: from CIoT GW 120 to CIoT eNB 118 at operation 910, and from CIoT eNB 118 to CIoT GW 120 at operation 912. The information elements for the CIAP data message are listed in Table 4, below.

TABLE 4

CIAP Data Message Information Elements

| IE/Group Name | Presence | Range | IE type and reference | Semantics description | Criticality |
|---|---|---|---|---|---|
| Message Type | M | | 2.4.1.1 | | YES |
| C-GW CIoT-UE CIAP ID | M | | 2.4.1.2 | | YES |
| CIoT- eNB- UE CIAP ID | M | | 2.4.1.3 | | YES |
| CIAP_Data_Msg | M | | | | YES |
| Subscriber Profile ID for RAT/Frequency priority | O | | 2.4.1.4 | | YES |

The Message Type Information Element (IE) uniquely identifies the message being sent, and may be mandatory for all messages in one or more embodiments. The IE type and reference is shown in Table 5, below.

TABLE 5

Information Element Type and Reference

| IE/Group Name | Presence | IE type and reference |
|---|---|---|
| Message Type >Procedure Code | M | (CIAP Setup, Paging, CIAP_DATA_MSG transport, Initial UE Message, Reset, Error Indication, CIAP_DATA Non Delivery Indication, CIoT-UE Capability Info Indication, Deactivate Trace, Trace Start, Trace Failure Indication, CIoT- eNB Configuration Update, CGW Configuration Update, Location Reporting Control, Location Reporting Failure Indication, Location Report, Overload Start, Overload Stop, Write-Replace Warning, CIoT- eNB Direct Information Transfer, C-GW Direct Information Transfer, Cell Traffic Trace, CIoT- eNB Configuration Transfer, CGW Configuration Transfer, Kill, CIoT-UE Radio Capability Match, PWS restart Indication |

The Mobility Management Entity (MME) User Equipment (UE) Cellular Internet of Things Application Protocol (CIAP) Identity (ID) (MME UE CIAP ID) uniquely identifies the UE association over the S1-Lite interface 114 within MME 122 as shown in Table 6, below:

TABLE 6

MME UE CIAP ID

| IE/Group Name | Presence | Range | IE type and reference | Semantics description |
|---|---|---|---|---|
| MME UE CIAP ID | M | | INTEGER $(0 \ldots 2^{32} - 1)$ | |

The CIoT evolved Node B (CIoT eNB) CIoT User Equipment (CIoT UE) Cellular Internet of Things Application Protocol (CIAP) Identity (ID) (CIoT eNB CIoT UE CIAP ID) uniquely identifies the UE association over the S1 interface 114 within the CIoT eNB 118 as shown in Table 7, below:

TABLE 7

CIoT eNB CIoT UE CIAP ID

| IE/Group Name | Presence | Range | IE type and reference | Semantics description |
|---|---|---|---|---|
| CIoT- eNB CIoT- UE CIAP ID | M | | INTEGER $(0 \ldots 2^{24} - 1)$ | |

In one or more embodiments, the Subscriber Profile Identity (ID) or (SPID) for Radio Access Technology (RAT)/Frequency Priority parameter received by the CIoT eNB 118 via the S1 Lite interface 114 may refer to user information, for example a service usage profile. Such information may be specific to a CIoT UE 116 and may apply to all the Radio Bearers of the CIoT UE 116. This index may be mapped by CIoT eNB 118 to a locally defined configuration in order to apply specific radio resource management (RRM) strategies, for example to define priorities of a radio resource control (RRC) idle (RRC_IDLE) mode. The Subscriber Profile ID information element (IE) for RAT/Frequency Selection Priority may utilized to define camp priorities in an Idle mode and to control inter-RAT/inter-frequency handovers in Active mode. The SPID IE is shown in Table 8, below.

TABLE 8

SPID for RAT/Frequency Priority

| IE/Group Name | Presence | Range | IE type and reference | Semantics description |
|---|---|---|---|---|
| Subscriber Profile ID for RAT/Frequency Priority | M | | INTEGER $(1 \ldots 256)$ | |

This message is sent by CIoT eNB 118 and may be utilized for carrying Non-Access Stratum (NAS) information over S1 Lite interface 114. The direction of flow for this message may be as follows: CIoT eNB 118 to MME 122 and/or CIoT GW 120. The information elements for this message are shown in Table 9, below:

TABLE 9

CIoT Message Information Elements

| IE/Group Name | Presence | Range | IE type and reference | Semantics description | Criticality | Assigned Criticality |
|---|---|---|---|---|---|---|
| Message Type | M | | 2.4.1.1 | | YES | ignore |
| MME CIoT UE CIAP ID | M | | 2.4.1.2 | | YES | reject |
| CIoT eNB-UE CIAP ID | M | | 2.4.1.3 | | YES | reject |
| CIAP_Data_MSG | M | | | | YES | reject |
| CITRAN CGI | M | | | | YES | ignore |

Figure 10:
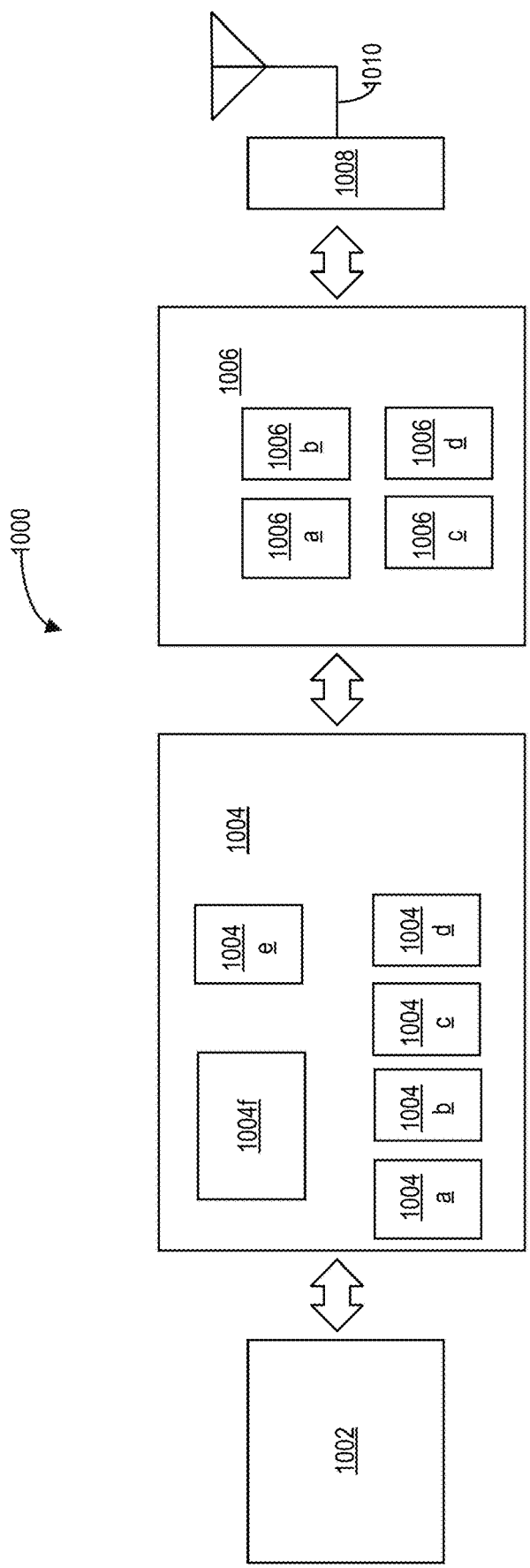
FIG. 10 is a diagram of example components of a wireless device in accordance with one or more embodiments.

Referring now to FIG. 10, example components of a wireless device such as a CIoT evolved NodeB (CIoT eNB) device, a CIoT gateway (CIoT GW) device, or a CIoT User Equipment (CIoT UE) device in accordance with one or more embodiments will be discussed. In some embodiments, device 1000 may include application circuitry 1002, baseband circuitry 1004, Radio Frequency (RF) circuitry 1006, front-end module (FEM) circuitry 1008 and one or more antennas 1010, coupled together at least as shown. In other embodiments, the above described circuitries may be included in various devices, in whole or in part, for example an eNB or a GW according to a cloud-RAN (C-RAN) implementation, and the scope of the claimed subject matter is not limited in these respects.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Application circuitry 1000 may include one or more application processors. For example, application circuitry 1000 may include circuitry such as, but not limited to, one or more single-core or multi-core processors. The one or more processors may include any combination of general-purpose processors and dedicated processors, for example graphics processors, application processors, and so on. The processors may be coupled with and/or may include memory and/or storage and may be configured to execute instructions stored in the memory and/or storage to enable various applications and/or operating systems to run on the system.

Baseband circuitry 1004 may include circuitry such as, but not limited to, one or more single-core or multi-core processors. Baseband circuitry 1004 may include one or more baseband processors and/or control logic to process baseband signals received from a receive signal path of RF circuitry 1006 and to generate baseband signals for a transmit signal path of the RF circuitry 1006. Baseband processing circuitry 1004 may interface with the application circuitry 1002 for generation and processing of the baseband signals and for controlling operations of the RF circuitry 1006. For example, in some embodiments, the baseband circuitry 1004 may include a second generation (2G) baseband processor 1004a, third generation (3G) baseband processor 1004b, fourth generation (4G) baseband processor 1004c, and/or one or more other baseband processors 1004d for other existing generations, generations in development or to be developed in the future, for example fifth generation (5G), sixth generation (6G), and so on. Baseband circuitry 1004, for example one or more of baseband processors 1004a through 1004d, may handle various radio control functions that enable communication with one or more radio networks via RF circuitry 1006. The radio control functions may include, but are not limited to, signal modulation and/or demodulation, encoding and/or decoding, radio frequency shifting, and so on. In some embodiments, modulation and/or demodulation circuitry of baseband circuitry 1004 may include Fast-Fourier Transform (FFT), precoding, and/or constellation mapping and/or demapping functionality. In some embodiments, encoding and/or decoding circuitry of baseband circuitry 1004 may include convolution, tail-biting convolution, turbo, Viterbi, and/or Low Density Parity Check (LDPC) encoder and/or decoder functionality. Embodiments of modulation and/or demodulation and encoder and/or decoder functionality are not limited to these examples and may include other suitable functionality in other embodiments.

In some embodiments, baseband circuitry 1004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. Processor 1004e of the baseband circuitry 1004 may be configured to run elements of the protocol stack for signaling of the PHY, MAC, RLC, PDCP and/or RRC layers. In some embodiments, the baseband circuitry may include one or more audio digital signal processors (DSP) 1004f The one or more audio DSPs 1004f may include elements for compression and/or decompression and/or echo cancellation and may include other suitable processing elements in other embodiments. Components of the baseband circuitry may be suitably combined in a single chip, a single chipset, or disposed on a same circuit board in some embodiments. In some embodiments, some or all of the constituent components of baseband circuitry 1004 and application circuitry 1002 may be implemented together such as, for example, on a system on a chip (SOC).

In some embodiments, baseband circuitry 1004 may provide for communication compatible with one or more radio technologies. For example, in some embodiments, baseband circuitry 1004 may support communication with an evolved universal terrestrial radio access network (EU-TRAN) and/or other wireless metropolitan area networks (WMAN), a wireless local area network (WLAN), a wireless personal area network (WPAN). Embodiments in which baseband circuitry 1004 is configured to support radio communications of more than one wireless protocol may be referred to as multi-mode baseband circuitry.

RF circuitry 1006 may enable communication with wireless networks using modulated electromagnetic radiation through a non-solid medium. In various embodiments, RF circuitry 1006 may include switches, filters, amplifiers, and so on, to facilitate the communication with the wireless network. RF circuitry 1006 may include a receive signal path which may include circuitry to down-convert RF signals received from FEM circuitry 1008 and provide baseband signals to baseband circuitry 1004. RF circuitry 1006 may also include a transmit signal path which may include circuitry to up-convert baseband signals provided by the baseband circuitry 1004 and provide RF output signals to FEM circuitry 1008 for transmission.

In some embodiments, RF circuitry 1006 may include a receive signal path and a transmit signal path. The receive signal path of RF circuitry 1006 may include mixer circuitry 1006a, amplifier circuitry 1006b and filter circuitry 1006c. The transmit signal path of RF circuitry 1006 may include filter circuitry 1006c and mixer circuitry 1006a. RF circuitry 1006 may also include synthesizer circuitry 1006d for synthesizing a frequency for use by the mixer circuitry 1006a of the receive signal path and the transmit signal path. In some embodiments, the mixer circuitry 1006a of the receive signal path may be configured to down-convert RF signals received from FEM circuitry 1008 based on the synthesized frequency provided by synthesizer circuitry 1006d. Amplifier circuitry 1006b may be configured to amplify the down-converted signals and the filter circuitry 1006c may be a low-pass filter (LPF) or band-pass filter (BPF) configured to remove unwanted signals from the down-converted signals to generate output baseband signals. Output baseband signals may be provided to baseband circuitry 1004 for further processing. In some embodiments, the output baseband signals may be zero-frequency baseband signals, although this may be optional. In some embodiments, mixer circuitry 1006a of the receive signal path may comprise passive mixers, although the scope of the embodiments is not limited in this respect.

In some embodiments, mixer circuitry 1006a of the transmit signal path may be configured to up-convert input baseband signals based on the synthesized frequency provided by synthesizer circuitry 1006d to generate RF output signals for FEM circuitry 1008. The baseband signals may be provided by the baseband circuitry 1004 and may be filtered by filter circuitry 1006c. Filter circuitry 1006c may include a low-pass filter (LPF), although the scope of the embodiments is not limited in this respect.

In some embodiments, mixer circuitry 1006a of the receive signal path and the mixer circuitry 1006a of the transmit signal path may include two or more mixers and may be arranged for quadrature down conversion and/or up conversion respectively. In some embodiments, mixer circuitry 1006a of the receive signal path and the mixer circuitry 1006a of the transmit signal path may include two or more mixers and may be arranged for image rejection, for example Hartley image rejection. In some embodiments, mixer circuitry 1006a of the receive signal path and the mixer circuitry 1006a may be arranged for direct down conversion and/or direct up conversion, respectively. In some embodiments, mixer circuitry 1006a of the receive signal path and mixer circuitry 1006a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, RF circuitry 1006 may include analog-to-digital converter (ADC) and digital-to-analog converter (DAC) circuitry, and baseband circuitry 1004 may include a digital baseband interface to communicate with RF circuitry 1006. In some dual-mode embodiments, separate radio integrated circuit (IC) circuitry may be provided for processing signals for one or more spectra, although the scope of the embodiments is not limited in this respect.

In some embodiments, synthesizer circuitry 1006d may be a fractional-N synthesizer or a fractional N/N+1 synthesizer, although the scope of the embodiments is not limited in this respect as other types of frequency synthesizers may be suitable. For example, synthesizer circuitry 1006d may be a delta-sigma synthesizer, a frequency multiplier, or a synthesizer comprising a phase-locked loop with a frequency divider.

Synthesizer circuitry 1006d may be configured to synthesize an output frequency for use by mixer circuitry 1006a of RF circuitry 1006 based on a frequency input and a divider control input. In some embodiments, synthesizer circuitry 1006d may be a fractional N/N+1 synthesizer.

In some embodiments, frequency input may be provided by a voltage controlled oscillator (VCO), although this may be optional. Divider control input may be provided by either baseband circuitry 1004 or applications processor 1002 depending on the desired output frequency. In some embodiments, a divider control input (e.g., N) may be determined from a look-up table based on a channel indicated by applications processor 1002.

Synthesizer circuitry 1006d of RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1, for example based on a carry out, to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006d may be configured to generate a carrier frequency as the output frequency, while in other embodiments, the output frequency may be a multiple of the carrier frequency, for example twice the carrier frequency, four times the carrier frequency, and so on, and used in conjunction with quadrature generator and divider circuitry to generate multiple signals at the carrier frequency with multiple different phases with respect to each other. In some embodiments, the output frequency may be a local oscillator (LO) frequency (fLO). In some embodiments, RF circuitry 1006 may include an in-phase and quadrature (IQ) and/or polar converter.

FEM circuitry 1008 may include a receive signal path which may include circuitry configured to operate on RF signals received from one or more antennas 710, amplify the received signals and provide the amplified versions of the received signals to the RF circuitry 1006 for further processing. FEM circuitry 1008 may also include a transmit signal path which may include circuitry configured to amplify signals for transmission provided by RF circuitry 1006 for transmission by one or more of the one or more antennas 1010.

In some embodiments, FEM circuitry 1008 may include a transmit/receive (TX/RX) switch to switch between transmit mode and receive mode operation. FEM circuitry 1008 may include a receive signal path and a transmit signal path. The receive signal path of FEM circuitry 1008 may include a low-noise amplifier (LNA) to amplify received RF signals and to provide the amplified received RF signals as an output, for example to RF circuitry 1006. The transmit signal path of FEM circuitry 1008 may include a power amplifier (PA) to amplify input RF signals, for example provided by RF circuitry 1006, and one or more filters to generate RF signals for subsequent transmission, for example by one or more of antennas 1010. In some embodiments, device 1000 may include additional elements such as, for example, memory and/or storage, display, camera, sensor, and/or input/output (I/O) interface, although the scope of the claimed subject matter is not limited in this respect.

The following are example implementations of the subject matter described herein. It should be noted that any of the examples and the variations thereof described herein may be used in any permutation or combination of any other one or more examples or variations, although the scope of the claimed subject matter is not limited in these respects. In example one, a Cellular Internet of Things evolved Node B (CIoT eNB) comprises baseband processing circuitry including one or more processors to process a Cellular Internet of Things Application Protocol (CIAP) setup request message received from a CIoT gateway (CIoT GW), wherein the CIAP setup request message is to configure a reduced signaling overhead between the CIoT eNB and the CIoT GW, or between the CIoT eNB and a CIoT user equipment (UE), or a combination thereof, and generate a CIAP setup response message to be transmitted to the CIoT GW in response to the CIAP setup request message. In example two, the apparatus may include the subject matter of example one or any of the examples described herein, wherein the CIAP setup request message and the CIAP response message are transmitted via an S1 Lite interface between the CIoT eNB and the CIoT GW. In example three, the apparatus may include the subject matter of example one or any of the examples described herein, wherein the baseband processing circuitry is configured to generate a Non-Access Stratum (NAS) Lite service request message to be transmitted to the CIoT GW. In example four, the apparatus may include the subject matter of example one or any of the examples described herein, wherein the baseband processing circuitry is configured to generate a CIAP data message to be transmitted to the CIoT GW. In example five, the apparatus may include the subject matter of example one or any of the examples described herein, wherein the baseband processing circuitry is configured to generate a CIAP setup complete message to be transmitted to the CIoT GW upon completion of configuration of a CIAP setup. In example six, the apparatus may include the subject matter of example one or any of the examples described herein, wherein the baseband processing circuitry is configured to process a last seen timer (LST) update message received by the CIoT user equipment (CIoT UE) to be forwarded to the CIoT GW. In example seven, the apparatus may include the subject matter of example one or any of the examples described herein, wherein the baseband processing circuitry is configured to process a CIAP paging message received from the CIoT GW to be forwarded to the CIoT user equipment (CIoT UE). In example eight, the apparatus may include the subject matter of example one or any of the examples described herein, wherein the baseband processing circuitry is configured to process a last seen timer (LST) update message received from the CIoT user equipment (CIoT UE). In example nine, the apparatus may include the subject matter of example one or any of the examples described herein, wherein the baseband processing circuitry is configured to process a last seen timer (LST) acknowledgment message received from a service capability server (SCS). In example ten, the apparatus may include the subject matter of example one or any of the examples described herein, wherein the CIAP setup request message comprises a Connection Establishment Indication procedure. In example eleven, the apparatus may include the subject matter of example one or any of the examples described herein, wherein the CIAP setup request message includes UE Radio Capability information.

In example twelve, a Cellular Internet of Things gateway (CIoT GW) comprises processing circuitry and memory to generate a Cellular Internet of Things Application Protocol (CIAP) setup request message to be transmitted to a CIoT evolved Node B (CIoT eNB), wherein the CIAP setup request message is to configure a reduced signaling overhead between the CIoT eNB and the CIoT GW, or between the CIoT eNB and a CIoT user equipment (UE), or a combination thereof, and process a CIAP setup response message received from the CIoT eNB in response to the CIAP setup request message. In example thirteen, the apparatus may include the subject matter of example twelve or any of the examples described herein, wherein the CIAP setup request message and the CIAP response message are transmitted via an S1 Lite interface between the CIoT eNB and the CIoT GW. In example fourteen, the apparatus may include the subject matter of example twelve or any of the examples described herein, wherein the processing circuitry is configure to process a last seen timer (LST) update message to be transmitted to a service capability server (SCS). In example fifteen, the apparatus may include the subject matter of example twelve or any of the examples described herein, wherein the processing circuitry is configured to perform a last seen timer (LST) check procedure with a home subscriber server (HSS) to obtain a last seen time when the CIoT user equipment (CIoT UE) was last seen active. In example sixteen, the apparatus may include the subject matter of example twelve or any of the examples described herein, wherein the processing circuitry is configured to generate a downlink data acknowledgement to be transmitted to a service capability server (SCS). In example seventeen, the apparatus may include the subject matter of example twelve or any of the examples described herein, wherein the processing circuitry is configured to generate a CIAP data message to be transmitted to the CIoT eNB. In example eighteen, the apparatus may include the subject matter of example twelve or any of the examples described herein, wherein the processing circuitry is configured to generate a CIAP paging message to be transmitted to the CIoT eNB. In example nineteen, the apparatus may include the subject matter of example twelve or any of the examples described herein, comprising a packet gateway (P-GW), a serving gateway (S-GW), or a mobility management entity (MME), or a combination thereof, configured to operate as a CIoT gateway. In example twenty, the apparatus may include the subject matter of example twelve or any of the examples described herein, wherein the CIAP setup request message comprises a Connection Establishment Indication procedure. In example twenty-one, the apparatus may include the subject matter of example twelve or any of the examples described herein, wherein the CIAP setup request message includes UE Radio Capability information.

In example twenty-two, one or more computer-readable media have instructions stored thereon that, if executed by a Cellular Internet of Things evolved Node B (CIoT eNB), result in processing a Cellular Internet of Things Application Protocol (CIAP) setup request message received from a CIoT gateway (CIoT GW), wherein the CIAP setup request message is to configure a reduced signaling overhead between the CIoT eNB and the CIoT GW, or between the CIoT eNB and a CIoT user equipment (UE), or a combination thereof, and generating a CIAP setup response message to be transmitted to the CIoT GW in response to the CIAP setup request message. In example twenty-three, the one or more computer-readable media may include the subject matter of example twenty-two or any of the examples described herein, wherein the CIAP setup request message and the CIAP response message are transmitted via an S1 Lite interface between the CIoT eNB and the CIoT GW. In example twenty-four, the one or more computer-readable media may include the subject matter of example twenty-two or any of the examples described herein, wherein the instructions, if executed, further result in generating a Non-Access Stratum (NAS) Lite service request message to be transmitted to the CIoT GW. In example twenty-five, the one or more computer-readable media may include the subject matter of example twenty-two or any of the examples described herein, wherein the instructions, if executed, further result in generating a CIAP data message to be transmitted to the CIoT GW. In example twenty-six, the one or more computer-readable media may include the subject matter of example twenty-two or any of the examples described herein, wherein the CIAP setup request message comprises a Connection Establishment Indication procedure.

In example twenty-seven, one or more computer-readable media have instructions stored thereon that, if executed by a Cellular Internet of Things gateway (CIoT GW), result in generating a Cellular Internet of Things Application Protocol (CIAP) setup request message to be transmitted to a CIoT evolved Node B (CIoT eNB), wherein the CIAP setup request message is to configure a reduced signaling overhead between the CIoT eNB and the CIoT GW, or between the CIoT eNB and a CIoT user equipment (UE), or a combination thereof, and processing a CIAP setup response message received from the CIoT eNB in response to the CIAP setup request message. In example twenty-eight, the one or more computer-readable media may include the subject matter of example twenty-seven or any of the examples described herein, wherein the CIAP setup request message and the CIAP response message are transmitted via an S1 Lite interface between the CIoT eNB and the CIoT GW. In example twenty-nine, the one or more computer-readable media may include the subject matter of example twenty-seven or any of the examples described herein, wherein the instructions, if executed, further result in processing a last seen timer (LST) update message to be transmitted to a service capability server (SCS). In example thirty, the one or more computer-readable media may include the subject matter of example twenty-seven or any of the examples described herein, wherein the instructions, if executed, further result in performing a last seen timer (LST) check procedure with a home subscriber server (HSS) to obtain a last seen time when the CIoT user equipment (CIoT UE) was last seen active.

In example thirty-one an apparatus of a Cellular Internet of Things evolved Node B (CIoT eNB) comprises means for processing a Cellular Internet of Things Application Protocol (CIAP) setup request message received from a CIoT gateway (CIoT GW), wherein the CIAP setup request message is to configure a reduced signaling overhead between the CIoT eNB and the CIoT GW, or between the CIoT eNB and a CIoT user equipment (UE), or a combination thereof, and means for generating a CIAP setup response message to be transmitted to the CIoT GW in response to the CIAP setup request message. In example thirty-two, the apparatus may include the subject matter of example thirty-one or any of the examples described herein, wherein the CIAP setup request message and the CIAP response message are transmitted via an S1 Lite interface between the CIoT eNB and the CIoT GW. In example thirty-three, the apparatus may include the subject matter of example thirty-one or any of the examples described herein, further comprising means for generating a Non-Access Stratum (NAS) Lite service request message to be transmitted to the CIoT GW. In example thirty-four, the apparatus may include the subject matter of example thirty-one or any of the examples described herein, further comprising means for generating a CIAP data message to be transmitted to the CIoT GW. In example thirty-five, the apparatus may include the subject matter of example thirty-one or any of the examples described herein, wherein the CIAP setup request message comprises a Connection Establishment Indication procedure.

In example thirty-six, an apparatus of a Cellular Internet of Things gateway (CIoT GW), comprises means for generating a Cellular Internet of Things Application Protocol (CIAP) setup request message to be transmitted to a CIoT evolved Node B (CIoT eNB), wherein the CIAP setup request message is to configure a reduced signaling overhead between the CIoT eNB and the CIoT GW, or between the CIoT eNB and a CIoT user equipment (UE), or a combination thereof, and means for processing a CIAP setup response message received from the CIoT eNB in response to the CIAP setup request message. In example thirty-seven, the apparatus may include the subject matter of example thirty-seven or any of the examples described herein, wherein the CIAP setup request message and the CIAP response message are transmitted via an S1 Lite interface between the CIoT eNB and the CIoT GW. In example thirty-eight, the apparatus may include the subject matter of example thirty-seven or any of the examples described herein, further comprising means for processing a last seen timer (LST) update message to be transmitted to a service capability server (SCS). In example thirty-nine, the apparatus may include the subject matter of example thirty-seven or any of the examples described herein, further comprising means for performing a last seen timer (LST) check procedure with a home subscriber server (HSS) to obtain a last seen time when the CIoT user equipment (CIoT UE) was last seen active.

Although the claimed subject matter has been described with a certain degree of particularity, it should be recognized that elements thereof may be altered by persons skilled in the art without departing from the spirit and/or scope of claimed subject matter. It is believed that the subject matter pertaining to lightweight S-1 lite protocol design for cellular internet of things and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A base station configured with a narrow band interface and to operate in a cellular internet of things (CIoT) access network comprising baseband processing circuitry including one or more processors to:
   process a S1-application protocol (AP) setup request message received from a CIoT gateway (CIoT GW), the CIOT GW comprising a mobility management entity (MME) integrated with a serving gateway node and a packet gateway node, wherein the S1-AP setup request message is to configure a connection between the base station and a CIoT user equipment (UE), and wherein the S1-AP setup request message includes a UE radio capability information element (IE) corresponding to the CIoT UE indicating a CIoT specific capability of the CIoT UE;
   generate a S1-AP setup response message to be transmitted to the CIoT GW in response to the S1-AP setup request message,
   wherein the S1-AP setup request message and the S1-AP response message are transmitted via an S1 interface between the base station and the CIoT GW, and wherein the S1 interface comprises a control plane that includes user plane functions.

2. The base station as claimed in claim 1, wherein the baseband processing circuitry is configured to generate a Non-Access Stratum (NAS) Lite service request message to be transmitted to the CIoT GW.

3. The base station as claimed in claim 1, wherein the baseband processing circuitry is configured to generate a data message to be transmitted to the CIoT GW.

4. The base station as claimed in in claim 1, wherein the baseband processing circuitry is configured to generate a setup complete message to be transmitted to the CIoT GW.

5. The base station as claimed in claim 1, wherein the baseband processing circuitry is configured to process a last seen timer (LST) update message received by the CIoT UE to be forwarded to the CIoT GW.

6. The base station as claimed in claim 1, wherein the baseband processing circuitry is configured to process a paging message received from the CIoT GW to be forwarded to the CIoT UE.

7. The base station as claimed in claim 1, wherein the baseband processing circuitry is configured to process a last seen timer (LST) update message received from the CIoT user equipment (CIoT UE).

8. The base station as claimed in claim 1, wherein the baseband processing circuitry is configured to process a last seen timer (LST) acknowledgment message received from a service capability server (SCS).

9. The base station as claimed in claim 1, wherein the S1-AP setup request message comprises a Connection Establishment Indication procedure.

10. A Cellular Internet of Things gateway (CIoT GW) comprising a mobility management entity (MME) integrated with a serving gateway node and a packet gateway node, the CIOT GW configured to perform operations comprising:
    generate a S1-application protocol (AP) setup request message to be transmitted to a base station configured with a narrow band interface to operate in CIoT access network, wherein the S1-AP setup request message is to configure a connection between the base station and a CIoT user equipment (UE) and wherein the S1-AP setup request message includes a radio capability information element (IE) corresponding to the CIoT UE indicating a CIoT specific capability of the CIoT UE; and
    process a S1-AP setup response message received from the base station in response to the S1-AP setup request message,
    wherein the S1-AP setup request message and the S1-AP response message are transmitted via an S1 interface between the base station and the MT GW, and wherein the S1 interface comprises a control plane that includes user plane functions.

11. The CIoT GW as claimed in claim 10, wherein the processing circuitry is configured to process a last seen timer (LST) update message to be transmitted to a service capability server (SCS).

12. The CIoT GW as claimed in claim 10, wherein the processing circuitry is configured to perform a last seen timer (LST) check procedure with a home subscriber server (HSS) to obtain a last seen time when the CIoT user equipment (CIoT UE) was last seen active.

13. The CIoT GW as claimed in claim 10, wherein the processing circuitry is configured to generate a downlink data acknowledgement to be transmitted to a service capability server (SCS).

14. The CIoT GW as claimed in claim 10, wherein the processing circuitry is configured to generate a data message to be transmitted to the base station.

15. The CIoT GW as claimed in claim 10, wherein the processing circuitry is configured to generate a paging message to be transmitted to the base station.

16. The CIoT GW as claimed in claim 10, further comprising a packet gateway (P-GW).

17. The CIoT eNB as claimed in claim 10, wherein the S1-AP setup request message comprises a Connection Establishment Indication procedure.

18. One or more non-transitory computer-readable media having instructions stored thereon that, if executed by a base station configured with a narrowband interface to operate in a cellular internet of things (CIoT) access network, result in:
    processing a S1-application protocol (AP) setup request message received from a CIoT gateway (CIoT GW), the CIoT comprising a mobility management entity integrated with a serving gateway node and a packet gateway node, wherein the S1-AP setup request message is to configure a connection between the base station and a CIoT user equipment (UE), and wherein the S1-AP setup request message includes a UE radio capability information element (IE) corresponding to the CIoT UE indicated a CIoT specific capability of the CIoT UE; and
    generating a S1-AP setup response message to be transmitted to the CIoT GW in response to the S1-AP setup request message,
    wherein the S1-AP setup request message and the S1-AP response message are transmitted via an S1 interface between the base station and the CIoT GW, and wherein the S1 interface comprises a control plane that includes user plane functions.

19. The one or more non-transitory computer-readable media as claimed in claim 18, wherein the instructions, if executed, further result in generating a Non-Access Stratum (NAS) Lite service request message to be transmitted to the CIoT GW.

20. The one or more non-transitory computer-readable media as claimed in claim 18, wherein the instructions, if executed, further result in generating a data message to be transmitted to the CIoT GW.

21. The one or more non-transitory computer-readable media as claimed in claim 18, wherein the S1-AP setup request message comprises a Connection Establishment Indication procedure.

22. One or more non-transitory computer-readable media having instructions stored thereon that, if executed by a Cellular Internet of Things gateway (CIoT GW) comprising a mobility management entity (MME) integrated with a serving gateway node and a packet gateway node, result in:
generating a S1-application protocol (AP) setup request message to be transmitted to a base station configured with a narrowband interface and to operate in CIoT access network, wherein the S1-AP setup request message is to configure a connection between the base station and a CIoT user equipment (UE) and wherein the S1-AP setup request message includes a UE radio capability information element (IE) corresponding to the CIoT UE indicating a CIoT specific capability of the CIoT UE; and processing a S1-AP setup response message received from the base station in response to the S1-AP setup request message,
wherein the S1-AP setup request message and the S1-AP response message are transmitted via an S1 interface between the base station and the CIoT GW, and wherein the S1 interface comprises a control plane that includes user plane functions.

23. The one or more non-transitory computer-readable media as claimed in claim 22, wherein the instructions, if executed, further result in processing a last seen timer (LST) update message to be transmitted to a service capability server (SCS).

24. The one or more non-transitory computer-readable media as claimed in claim 22, wherein the instructions, if executed, further result in performing a last seen timer (LST) check procedure with a home subscriber server (HSS) to obtain a last seen time when the CIoT user equipment (CIoT UE) was last seen active.

* * * * *

UNITED STATES PATENT AND TRADEMARK OFFICE
CERTIFICATE OF CORRECTION

PATENT NO. : 11,510,094 B2
APPLICATION NO. : 15/743168
DATED : November 22, 2022
INVENTOR(S) : Jain et al.

Page 1 of 1

It is certified that error appears in the above-identified patent and that said Letters Patent is hereby corrected as shown below:

In the Claims

Claim 10, Column 18, Line 13:
"between the base station and the MT GW, and wherein" should read "between the base station and the CIoT GW, and wherein".

Signed and Sealed this
Seventeenth Day of January, 2023

Katherine Kelly Vidal
*Director of the United States Patent and Trademark Office*